(12) United States Patent
Steinhauser et al.

(10) Patent No.: US 11,414,509 B2
(45) Date of Patent: Aug. 16, 2022

(54) STAR-BRANCHED DIENE RUBBER

(71) Applicant: ARLANXEO DEUTSCHLAND GMBH, Dormagen (DE)

(72) Inventors: Norbert Steinhauser, Dormagen (DE); Peter Karbaum, Bornheim-Dersdorf (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 244 days.

(21) Appl. No.: 16/627,646

(22) PCT Filed: Jul. 16, 2018

(86) PCT No.: PCT/EP2018/069292
§ 371 (c)(1),
(2) Date: Dec. 30, 2019

(87) PCT Pub. No.: WO2019/016152
PCT Pub. Date: Jan. 24, 2019

(65) Prior Publication Data
US 2021/0139625 A1    May 13, 2021

(30) Foreign Application Priority Data
Jul. 19, 2017 (EP) ..................... 17182036

(51) Int. Cl.
| *C08F 236/06* | (2006.01) |
| *C08C 19/40* | (2006.01) |
| *C08C 19/44* | (2006.01) |
| *C08F 279/04* | (2006.01) |

(52) U.S. Cl.
CPC ............ *C08F 236/06* (2013.01); *C08C 19/40* (2013.01); *C08C 19/44* (2013.01); *C08F 279/04* (2013.01)

(58) Field of Classification Search
CPC .......... C08F 36/04; C08F 36/06; C08F 36/08; C08F 2500/17; C08F 2810/40; C08C 19/40; C08C 19/42; C08C 19/44; C08C 19/25
See application file for complete search history.

(56) References Cited

U.S. PATENT DOCUMENTS

| 4,183,877 A | 1/1980 | Ibaragi et al. |
| 4,185,042 A * | 1/1980 | Verkouw .............. C08G 81/022 |
| | | 525/105 |
| 4,403,074 A | 9/1983 | Moczygemba |
| 4,639,494 A | 1/1987 | Imai et al. |
| 5,508,333 A * | 4/1996 | Shimizu .................. C08C 19/44 |
| | | 524/423 |
| 6,362,282 B1 | 3/2002 | DeDecker |
| 6,380,303 B1 | 4/2002 | Ogoe et al. |
| 7,232,864 B2 | 6/2007 | Bening |
| 7,683,111 B2 * | 3/2010 | Hogan .................. B60C 1/0016 |
| | | 524/106 |
| 8,481,644 B2 | 7/2013 | Hamann et al. |
| 2004/0092649 A1 | 5/2004 | Brandt et al. |
| 2008/0114137 A1 | 5/2008 | Kim et al. |
| 2011/0092646 A1 * | 4/2011 | Hamann .................. C08L 55/02 |
| | | 525/95 |
| 2012/0309902 A1 | 12/2012 | Okabe et al. |
| 2016/0319045 A1 | 11/2016 | Dire et al. |

FOREIGN PATENT DOCUMENTS

| CN | 10211509 A | 7/2011 |
| CN | 102115509 A | 7/2011 |
| EP | 0 277 687 A2 | 8/1988 |
| RU | 2510401 C2 | 3/2014 |
| TW | I242582 B | 11/2005 |
| TW | 201139478 A | 11/2011 |
| WO | 98/29457 A1 | 7/1998 |
| WO | 99/09081 A1 | 2/1999 |
| WO | 01/62851 A1 | 8/2001 |
| WO | 01/94422 A1 | 12/2001 |

OTHER PUBLICATIONS

Search Report dated Nov. 13, 2017, issued in connection with European Patent Application No. 17182036.8.
Franta, Elastomers and Rubber Compounding Materials; Elsevier 1989, pp. 113-131.
Houben-Weyl, Methoden der Organischen Chemie [Methods of Organic Chemistry], Thieme Verlag, Stuttgart, 1961, vol. XIV/1, pp. 645 to 673.
Houben-Weyl, Methoden der Organischen Chemie [Methods of Organic Chemistry], Thieme Verlag, Stuttgart vol. E 20 (1987), pp. 114 to 134 and pp. 134 to 153.
Comprehensive Polymer Science, vol. 4, Part II (Pergamon Press Ltd., Oxford 1989), pp. 53-108.
International Search Report dated Nov. 9, 2018, and issued in connection with PCT International Application No. PCT/EP2018/069292.
Written Opinion dated Nov. 9, 2018, in connection with PCT International Application No. PCT/EP2018/069292.

* cited by examiner

*Primary Examiner* — Robert C Boyle
(74) *Attorney, Agent, or Firm* — Norris McLaughlin PA

(57) ABSTRACT

A star-branched diene rubber, the process for making such a rubber and its use in high impact polystyrene (HIPS) and acrylonitrile butadiene styrene (ABS) polymers.

16 Claims, No Drawings

STAR-BRANCHED DIENE RUBBER

This application is a § 371 national stage of PCT International Application No. PCT/EP2018/069292, filed Jul. 16, 2018, which claims foreign priority benefit under 35 U.S.C. § 119 of European Patent Application No. 17182036.8, filed Jul. 19, 2017, the entire disclosures of each of which are incorporated herein by reference.

BACKGROUND OF THE INVENTION

The present invention relates generally to a star-branched diene rubber, the process for making such a rubber and its inclusion, for example, in high impact polystyrene (HIPS) and acrylonitrile butadiene styrene (ABS) polymers. Star-branched polymers are conventionally prepared using coupling agents with at least three reactive sites per molecule. Methods for preparing such polymers having radial or star branching macrostructure are well-known in the art. Methods for preparing a polymer of butadiene using a coupling agent are illustrated in U.S. Pat. No. 4,403,074 A and WO 99/09081. One example of a commercially available star-branched anionically polymerized polybutadiene, coupled via tetrafunctional coupling agent, is Buna CB 565 brand polybutadiene available from Arlanxeo.

Star-branched diene rubbers show distinct advantages in comparison to their linear counterparts when used in HIPS- and ABS-type resins. Due to their higher ratio of Mooney viscosity to solution viscosity (MV/SV) they allow one to effectively balance and achieve high surface gloss while maintaining high impact properties for HIPS and ABS.

U.S. Pat. No. 4,183,877 describes polybutadiene for HIPS with a vinyl content of 15-35%, Mooney viscosity (MV) of 25-85 Mooney units, solution viscosity (5 wt.-% in styrene) of 50-200 mPas and a MV/SV range of 0.33<MV/SV<0.67 for the polybutadiene. As coupling reagents silicon tetrachloride and carbon tetrachloride were used. The high vinyl content of 15% deteriorates, however, the low temperature property of HIPS, and the relatively low MV/SV requires either a low MV, which leads to undesired high cold flow, or it requires high SV, which is detrimental for the rubber dissolution time and the rubber particle size in the HIPS resin.

U.S. Pat. No. 4,639,494 describes a process for HIPS production which makes use of branched butadiene homo- and copolymers. These butadiene homo- and copolymers are prepared with multifunctional halogen compounds, and they are characterized by a vinyl content of 18-32 mol-%, MV of 40-90 MU, solution viscosity (SV) of 60-90 mPas, and 0.78≤ML/SV≤1.43.

In EP 0 277 687 silicon-based coupling agents are mentioned in the formation of star-branched rubbers with SV<60 mPas, MV<85 MU, MV/SV>0.7 These rubbers are used for making HIPS- and ABS-type resins.

WO 99/09081 describes the advantage of using a star-branched polybutadiene for balancing the surface gloss and impact properties of HIPS. The star-branched polybutadiene used for this purpose is a commercial grade with the former denomination HX 565 from Bayer, now known as CB 565 from Arlanxeo. This grade has a MV of 60 MU, SV of 44 mPas and MV/SV of 1.36. It is made with $SiCl_4$ as coupling agent. However, branched rubbers made with halogen containing coupling agents are known for causing discoloration. Furthermore, the use of halogen containing coupling agents for branched rubbers can lead to corrosion problems while using these rubbers in the HIPS and ABS process.

There are several measures described for reducing the discoloration of butadiene rubbers. All of these measures require, however, the addition of an additive after the polymerization process (U.S. Pat. No. 4,403,074: addition of aliphatic dicarboxylic acids; WO 9829457: addition of epoxidized soy bean oil; WO 2001/094422: addition of sodium dithionite; US 2008/0114137: addition of phosphate ester).

A need has therefore been recognized in connection with providing for HIPS and ABS polymer applications a star-branched polybutadiene having a high degree of star-branching (expressed by a high MV/SV), low solution viscosity and low rubber discoloration. Surprisingly it has now been found that star-branched butadiene rubbers according to the invention overcome the aforementioned problems. These butadiene rubbers are characterized by being made with a halogen-free coupling agent and having a vinyl content of <15 wt.-%, MV/SV>1.0, 30 mPas<SV<60 mPas, 30 MU<MV<80 MU, and showing a low rubber discoloration expressed by APHA number (5% solution in styrene)<100.

If not otherwise stated herein, it is to be assumed that all patents, patent applications, patent publications and other publications mentioned and cited herein are hereby fully incorporated by reference herein as if set forth in their entirety herein.

BRIEF SUMMARY OF THE INVENTION

There is broadly contemplated, in accordance with at least one presently preferred embodiment of the present invention, a star-branched diene rubber having a vinyl content of less than 15 wt.-% based on the total weight of the rubber, a Mooney viscosity (ML 1+4 at 100° C.) from 30 to 80 MU, a solution viscosity in the range of 30 to 60 mPas, a low rubber discoloration expressed by APHA number (5% solution in styrene) of less than 100, wherein a ratio of the Mooney viscosity to the solution viscosity is greater than 1.0. Further in an embodiment said star-branched rubber comprises the reaction product of at least one conjugated diene rubber and a coupling agent according to the formula (I)

$$R_1-R_2-Si-(R_3)_3 \qquad (I)$$

where
$R_1$ is glycidoxy,
$R_2$ is optionally substituted C1 to C8 alkylene optionally containing one or more oxygens, and
$R_3$ is $C_1$ to $C_8$ alkoxy.

In one embodiment there is a process for the production of a star-branched diene rubber having a vinyl content of less than 15 wt.-% based on the total weight of the rubber, a Mooney viscosity in the range of 30 to 80 MU, a solution viscosity in the range of 30 to 60 mPas, a low rubber discoloration expressed by APHA number (5% solution in styrene) of less than 100, a ratio of the Mooney viscosity to the solution viscosity of greater than 1.0, comprising: anionically polymerizing at least one conjugated diene monomer, thereby forming a diene polymer, and reacting the active chain ends of the diene polymer with a coupling agent according to the formula (I) as provided above.

In a further embodiment there is a high-impact polystyrene (HIPS) or acrylonitrile butadiene styrene (ABS) compound comprising the star-branched diene rubber as described above and wherein polystyrene for HIPS or styrene-acrylonitrile copolymer for ABS, are grafted to said star-branched diene rubber and where said star-branched diene rubber having prior to said grafting a vinyl content of less than 15 wt.-% based on the total weight of the rubber, a Mooney viscosity (ML1+4 at 100° C.) from 30 to 80 MU, a solution viscosity in the range of 30 to 60 mPas, a low rubber discoloration expressed by APHA number (5% solution in styrene) of less than 100, wherein the ratio of the Mooney viscosity to the solution viscosity is greater than 1.0, and further wherein said star-branched rubber comprises the reaction product of at least one conjugated diene rubber, and a coupling agent according to the formula (I) as above.

In another embodiment of the invention, the monomer for making the polymer chains of the star-branched diene rubber is selected from the group of 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, 1,3-octadiene or mixtures thereof. Particular preference is given to 1,3-butadiene.

In another embodiment of the invention, the coupling agents are 3-glycidoxypropyltrimethoxysilane and 3-glycidoxypropyltriethoxysilane.

In another embodiment, there is the use of the star-branched diene rubber of the invention in high-impact polystyrene (HIPS) or acrylonitrile butadiene styrene (ABS) compounds, especially for improving discoloration properties of the high-impact polystyrene (HIPS) or acrylonitrile butadiene styrene (ABS) compounds.

For a better understanding of the present invention, together with other and further features and advantages thereof, reference is made to the following description and the scope of the invention will be pointed out in the appended claims.

DETAILED DESCRIPTION OF THE PREFERRED EMBODIMENTS

Although the preferred embodiment of the present invention is described herein, it is to be understood that the invention is not limited to that precise embodiment, and that various other changes and modifications may be affected therein by one skilled in the art without departing from the scope or spirit of the invention. It should be noted at this point that the scope of the invention includes any and all possible combinations of the components, ranges of values and/or process parameters mentioned herein, in general terms or within areas of preference.

Any of the known dienes conventionally used for the preparation of corresponding polymer anions can be used as monomers for preparing the star-branched diene rubbers. Preferred diene monomers for the production of the coupled diene polymer are 1,3-butadiene, isoprene, 1,3-pentadiene, 2,3-dimethyl-1,3-butadiene, 2phenyl-1,3-butadiene, 1,3-hexadiene, 3-butyl-1,3-octadiene and/or 1,3-octadiene. Particular preference is given to 1,3-butadiene.

These diene polymers are preferably prepared by anionic solution polymerization. Initiators for the anionic solution polymerization process are those based on alkali metal or on alkaline earth metals, e.g. methyllithium, ethyllithium, isopropyllithium, n-butyllithium, sec-butyllithium, tert-butyllithium, n-pentyllithium, n-hexyllithium, cyclohexyllithium, octyllithium, decyllithium, 2-(6-lithio-n-hexoxy)tetrahydropyran, 3-(tert-butyldimethylsiloxy)-1-propyllithium, phenyllithium, 4-butylphenyllithium, 1-naphthyllithium, p-toluyllithium, lithium amides of secondary amines, e.g. lithium pyrrolidide, lithium piperidide, lithium hexamethyleneimide, lithium diphenylamide. These lithium amides can also be produced in situ via reaction of an organolithium compound with secondary amines. It is preferable to use n-butyllithium and sec-butyllithium.

The amount of anionic solution polymerization initiator can vary depending upon the desired polymeric properties and reaction conditions. In one embodiment it is preferred that from about 0.05 to about 0.3 phm (parts per 100 pbw of monomer) of initiator is used. Preferably from about 0.08 to about 0.25 phm and particularly preferred is from about 0.1 to about 0.22 phm.

The polymerization reaction can be carried out by conventional methods in one or more stages and, respectively, batchwise or continuously. The continuous method in a reactor cascade composed of a plurality of reactors in series, preferably at least 2, in particular from 2 to 5, is also possible.

Solution polymerization processes are described by way of example in I. Franta, Elastomers and Rubber Compounding Materials; Elsevier 1989, pp. 113-131, in Houben-Weyl, Methoden der Organischen Chemie [Methods of Organic Chemistry], Thieme Verlag, Stuttgart, 1961, Volume XIV/1, pp. 645 to 673 or Volume E 20 (1987), pp. 114 to 134 and pp. 134 to 153, and also in Comprehensive Polymer Science, Vol. 4, Part II (Pergamon Press Ltd., Oxford 1989), pp. 53-108.

The preferred diene polymerization process is conducted in a solvent. Preferred solvents used for the polymerization process are inert aprotic solvents, e.g., paraffinic hydrocarbons, such as isomeric butanes, pentanes, hexanes, heptanes, octanes and decanes, cyclopentane, cyclohexane, methylcyclohexane, ethylcyclohexane or 1,4-dimethylcyclohexane, or aromatic hydrocarbons, such as benzene, toluene, ethylbenzene, xylene, diethylbenzene or propylbenzene. These solvents can be used individually or in combination. Preference is given to cyclohexane, n-hexane and hexane isomers. Blending with polar solvents is likewise possible.

The amount of solvent for the process according to the invention is usually from 100 to 1000 g, preferably from 200 to 700 g, based on 100 g of the entire amount of monomer used. However, it is also possible to polymerize the monomers used in the absence of solvents.

In a possible method for conducting the polymerization process, the monomers and the solvent are used as initial charge, and the polymerization process is then initiated via addition of the initiator or catalyst. It is also possible to polymerize the materials in a feed process in which monomers and solvent are added to the polymerization reactor, where the initiator or catalyst is used as initial charge or is added with the monomers and the solvent. There are possible variations, for example use of the solvent as initial charge in the reactor, addition of the initiator or catalyst and then addition of the monomers. It is also possible to operate the polymerization process continuously. In all cases, it is possible to add further monomer and solvent during, or at the end of, the polymerization process.

The polymerization time can vary widely from a few minutes to some hours as necessary to obtain the desired conversion. In one embodiment the polymerization time is usually about 5 minutes up to 4 hours, preferably from 10 minutes to 2 hours. The polymerization process can be conducted either at atmospheric pressure or else at elevated pressure (from 1 to 10 bar). In another embodiment the conversion is performed to at least about 90 percent and preferably at least about 99 percent. The temperature may vary from about −20° C. to about 160° C., preferably from about 20° C. to about 140° C., more preferably from about 50° C. to about 120° C.

The polymerization solvent can be removed from the polymerization process by the conventional methods, such as distillation, steam stripping, or application of a vacuum, optionally at elevated temperature.

The coupling reaction producing the star-branched diene rubbers may be performed using conventional techniques available to the skilled artisan whereby a diene polymer having reactive chain ends is reacted with a coupling agent. The coupling reaction may be performed in the same or separate reactor as the polymerization and in the same or different solvent.

The preparation of the inventive coupled polymers is preferably carried out in two steps. The first step prepares the polydiene, which in the second step is reacted with the coupling agents defined herein. These coupling agents can be added at any desired juncture of the polymerization reaction, depending on the desired properties of the polymers to be prepared.

In a preferred approach, the coupling agents are added after the completion of the polymerization reaction. Thus, the coupling reaction of the diene polymer with the coupling agents is then carried out in the second step. Coupling agents of the invention are multifunctional compounds which preferably are able to bond to at least three polydiene chains. Such coupling agents are according to formula (I)

(I)

where
$R_1$ is glycidoxy,
$R_2$ is optionally substituted C1 to C8 alkylene optionally containing one or more oxygens, and
$R_3$ is $C_1$ to $C_8$ alkoxy.

Particularly preferred coupling agents are 3-glycidoxypropyltrimethoxysilane and 3-glycidoxypropyltriethoxysilane.

Per the coupling reaction between the coupling agents and polydienes, the polymerization mixture obtained during the polymerization reaction can be mixed with the abovementioned coupling agents. The coupling agent may be dissolved in a suitable organic solvent such as those described above in regard to the polymerization step. A particularly preferable solvent is cyclohexane.

In the coupling reaction it is advantageous to exclude disruptive compounds which could impair the coupling reaction. Examples of these disruptive compounds are carbon dioxide, oxygen, water, alcohols, and organic and inorganic acids.

The amount of coupling agent used depends on the desired degree of coupling. The amount of coupling agents is preferably in the range from 0.1 to 0.4 mole of coupling reagent per 1 mole of initiator or catalyst, in particular from 0.2 to 0.3 mole of coupling reagent per 1 mole of initiator or catalyst.

The coupling reaction is usually carried out at temperatures approximately corresponding to the temperatures obtained at the end of the polymerization reaction. This means that the coupling reaction is carried out at temperatures of from about 30° C. to 160° C., preferably from 50° C. to 120° C. The coupling reaction can likewise be carried out at atmospheric pressure or else at elevated pressure (from 1 to 10 bar). The reaction time is preferably in the range from about 1 minute to about 1 hour.

After the coupling reaction, the resultant reaction mixture can be treated with terminating reagents which contain active hydrogen, e.g. alcohols, acids or water or appropriate mixtures. Antioxidants can be added to the reaction mixture before the star-branched polymer is isolated.

In one embodiment, the pH of the resultant star-branched diene rubbers is adjusted to be less than 11, preferably less than 10, and more preferably less than 9.5. The pH adjustment can be achieved by conventional means such as, for example, through the addition of an acid (e.g., mineral acid, carboxylic acid) or the pH adjustment can be achieved by steam-stripping whereas additives are added to the stripping water.

The solvent can be removed by the conventional methods, such as distillation, steam stripping, or application of a vacuum, optionally at elevated temperature.

The molecular weight of the inventive star-branched diene rubbers can vary widely. For the conventional applications of the inventive polymers, the peak molecular weight is preferably above 300 000 g/mol The Mooney viscosity (MV) and solution viscosity (SV), of the star-branched diene rubbers may vary depending upon the starting materials, the desired properties, and the process employed. However, typically, the Mooney viscosity ML1+4 at 100° C. of the coupled diene polymers is from about 30 to about 80 MU, preferably from about 40 to about 70, more preferably from about 45 to about 65 MU.

The solution viscosity of a 5 percent solution in styrene is typically from about 30 to about 60 mPas, preferably from about 40 to about 50 mPas measured at a temperature of 25 degrees centigrade.

The inventive star-branched diene rubbers can be used in the production of HIPS and ABS resins. In one embodiment there is a HIPS or ABS resin containing this star-branched diene polymer. In a preferred embodiment the relative discoloration of a HIPS or ABS resin containing this star-branched diene polymer is decreased as compared to such a HIPS or ABS resin containing a coupled diene rubber prepared by use of a halogen-containing coupling agent.

The amount of star-branched diene polymer present in the HIPS or ABS resin compositions is from about 3 to about 20 weight percent based on the total weight of the composition. In a preferred embodiment the coupled diene polymer is present in an amount of 5 to 15 weight percent, and particularly preferred from 7 to 13 weight percent.

The inventive composition comprising HIPS or ABS resin and coupled diene polymer is preferably prepared by polymerizing styrene, or copolymerizing styrene and acrylonitrile, respectively, in the presence of a suitable amount of the coupled diene polymer.

Suitable amounts of the star-branched diene polymer in the HIPS or ABS compositions will vary depending upon the desired properties. In one embodiment for a HIPS composition, the styrene may be polymerized in the presence of from about 3 to about 20 weight percent of star-branched diene rubbers based on total weight of styrene and star-branched diene rubbers. For one ABS composition embodiment, styrene and acrylonitrile may be copolymerized in the presence of from 2 to about 20 weight percent of star-branched diene rubbers based on total weight of styrene, acrylonitrile and star-branched diene rubbers. Additional polymers may be included in the HIPS and ABS compositions as may be appreciated by the skilled artisan.

EXPERIMENTAL

The Mooney viscosity (MV) as used herein is determined by the standard ASTM D1646 (1999) and measures the torque of the sample at 100° C. The Mooney viscosity measured is in "Mooney units" (MU, with 100 MU=8.3 Nm). The rubber sample is preheated for 1 minute and the torque 4 minutes later is read (ML1+4 at 100° C.).

The solution viscosity (SV) as used herein is determined at a polybutadiene rubber concentration of 5 wt.-% in styrene by using a B-type viscometer placed in a thermostat at 25° C.

The vinyl content is determined via FTIR spectroscopy on the polymer film.

oven for 16 h at 65° C. The dried polybutadiene rubber had a Mooney viscosity (ML1+4 at 100° C.) of 57.5 MU, a solution viscosity of 46.7 mPas, MV/SV of 1.23, a vinyl content of 9.2 wt.-%, a peak molecular weight of 341 kg/mol and an APHA number of 68.

The same procedure was applied with further coupling agents. The results are summarized in Table 1.

|  | Coupling agent | Mooney viscosity [MU] | Solution viscosity [mPas] | MV/SV | Peak molecular weight [kg/mol] | APHA number | pH |
| --- | --- | --- | --- | --- | --- | --- | --- |
| Example 1 | A | 57.5 | 46.7 | 1.23 | 341 | 68 | 8.3 |
| Example 2 | B | 51.8 | 41.2 | 1.26 | 314 | 90 | 9.1 |
| Comparative example 1 | C | <15 | 30.3 | <0.5 | 210 | 67 | 6.2 |
| Comparative example 2 | D | 52.5 | 45.5 | 1.15 | 290 | 67 | 7.6 |
| Comparative example 3 | E | 68.6 | 50.9 | 1.35 | 321 | 193 | 5.7 |
| Comparative example 4 | F | 20.3 | 32.0 | 0.63 | 117 | 623 | 8.7 |
| Comparative example 5 | G | 32.2 | 36.3 | 0.89 | 307 | 72 | 9.4 |
| Comparative example 6 | H | 23.7 | 40.0 | 0.59 | 233 | 65 | 8.9 |

A: 3-Glycidoxypropyltrimethoxysilane
B: 3-Glycidoxypropyltriethoxysilane
C: n-Propyltrimethoxysilane
D: Tetramethoxysilane
E: Tetrachlorosilane
F: 1,1,1,1-Tetra(glycidyloxymethyl)methane
G: 2-(3,4-Epoxycyclohexyl)ethyltriethoxysilane
H: (3-Methacryloxypropyl)trimethoxysilane The peak molecular weight Mp is determined by means of gel permeation chromatography (GPC), calibrated with polystyrene standards.

The APHA color determination is done according to DIN EN ISO 6271. It compares the color of a 5 wt.-% solution of the rubber in styrene to the APHA color scale (Platinum/Cobalt scale).

The ratio MV/SV is calculated as the ratio of the Mooney viscosity (described above) to the solution viscosity (described above).

The pH value is determined according to the following procedure: 2 g of rubber are dissolved in 18 g of toluene. 20 g of water are added and the two-phase system is shaken for 2 hours. Afterwards the pH value of the water phase is measured.

The examples below serve for illustration of the invention, without any resultant limiting effect.

Example 1: Polybutadiene Rubber, Coupled with 3-Glycidoxypropyltrimethoxysilane

A 20 L steel reactor equipped with a stirrer and a jacket was filled under inert conditions with 8.5 kg of technical hexane and 1.5 kg of butadiene. 27.6 mmol of n-butyllithium (23 wt.-% solution in hexane) were added via syringe. The temperature of the reaction mixture was kept at 70° C. for 60 min. After the polymerization step 6.9 mmol of 3-glycidoxypropyltrimethoxysilane were added via syringe and stirring was continued for 30 min. After adding 0.2 wt.-% of the stabilizer 2,4-bis(octylthiomethyl)-6-methylphenol, steam-stripping was applied to the polymer solution in order to remove the solvent. The stripping water contained calcium acetate in an amount of 0.2 wt.-% related to the amount of rubber. The water wet rubber crumbs were dried in a vacuum As can be seen from the values in Table 1, the use of the coupling agents 3-glycidoxypropyltrimethoxysilane and 3-glycidoxypropyltriethoxysilane (examples 1 and 2) leads to a high star-branching efficiency, expressed by a high ratio MV/SV, in combination with a high peak molecular weight and an APHA number below 100.

What is claimed is:

1. A star-branched diene rubber comprising
   a vinyl content of less than 15 wt.-% based on the total weight of the rubber,
   a Mooney viscosity (ML 1+4 at 100° C.) from 30 to 80 MU,
   a solution viscosity in the range of 30 to 60 mPas,
   a low rubber discoloration expressed by APHA number (5% solution in styrene) of less than 100, and
   wherein a ratio of the Mooney viscosity to the solution viscosity is greater than 1.0.

2. The star-branched diene rubber according to claim 1, wherein said star-branched rubber comprises the reaction product of at least one conjugated diene rubber and a coupling agent according to formula (I)

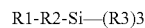

R1-R2-Si—(R3)3    (I)

where
R1 is glycidoxy,
R2 is optionally substituted C1 to C8 alkylene optionally containing one or more oxygens, and
R3 is C1 to C8 alkoxy.

3. The star-branched diene rubber according to claim 1, wherein the star-branched diene rubber contains polymer chains derived from the polymerization of monomers from the group of 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, 1,3-octadiene or mixtures thereof.

4. The star-branched diene rubber according to claim 2, wherein the coupling agents is either 3-glycidoxypropyltrimethoxysilane or 3-glycidoxypropyltriethoxysilane.

5. The star-branched diene rubber according to claim 1, wherein the rubber has a peak molecular weight (Mp) greater than 300,000 g/mol.

6. A process for the production of the star-branched diene rubber according to claim 1, comprising:
polymerizing at least one conjugated diene monomer, thereby forming a diene polymer, and
reacting the diene polymer with a coupling agent according to the formula (I)

where
R1 is glycidoxy,
R2 is optionally substituted C1 to C8 alkylene optionally containing one or more oxygens, and
R3 is C1 to C8 alkoxy, thereby forming a star-branched diene rubber.

7. The process according to claim 6, wherein the at least one conjugated diene monomer is selected from 1,3-butadiene, isoprene, 2,3-dimethyl-1,3-butadiene, 1,3-pentadiene, 1,3-hexadiene, 3-butyl-1,3-octadiene, 1,3-octadiene, 2-phenyl-1,3-butadiene or mixtures thereof.

8. The process according to claim 6, wherein the coupling agent is either 3-glycidoxypropyltrimethoxysilane or 3-glycidoxypropyltriethoxysilane.

9. The process according to claim 6, further comprising:
adjusting the pH of the star-branched diene rubber to less than 11.

10. A star-branched diene rubber obtained by the process according to claim 6.

11. A high-impact polystyrene (HIPS) or acrylonitrile butadiene styrene (ABS) compound, comprising:
the star-branched diene rubber according to claim 1, wherein a polystyrene portion for HIPS or styrene-acrylonitrile copolymer portion for ABS are grafted to said star-branched diene rubber.

12. The high-impact polystyrene (HIPS) or acrylonitrile butadiene styrene (ABS) compound according to claim 11, wherein the star-branched diene rubber is selected from the group of poly(1,3-butadiene), polyisoprene, poly(2,3-dimethyl-1,3-butadiene), poly(1,3-pentadiene), poly(1,3-hexadiene), poly(1,3-octadiene), poly(3-butyl-1,3-octadiene), poly(2-phenyl-1,3-butadiene) or mixtures thereof.

13. The high-impact polystyrene (HIPS) or acrylonitrile butadiene styrene (ABS) compound according to claim 11, wherein the coupling agents are 3-glycidoxypropyltrimethoxysilane and 3-glycidoxypropyltriethoxysilane.

14. The high-impact polystyrene (HIPS) or acrylonitrile butadiene styrene (ABS) compound according to claim 11, wherein the star-branched diene rubber has prior to grafting a pH of less than 11.

15. The high-impact polystyrene (HIPS) or acrylonitrile butadiene styrene (ABS) compound according to claim 11, wherein the star-branched diene rubber has prior to grafting a peak molecular weight greater than 300,000 g/mol.

16. The high-impact polystyrene (HIPS) or acrylonitrile butadiene styrene (ABS) compound according to claim 11, wherein the star-branched diene rubber is selected from the group of poly(1,3-butadiene), polyisoprene and mixtures thereof.

* * * * *